Feb. 15, 1927.
J. E. BROWN
TROLLING LURE
Filed Feb. 10, 1926
1,617,318
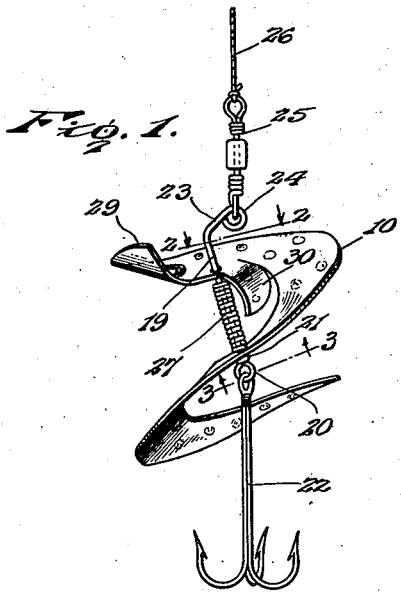
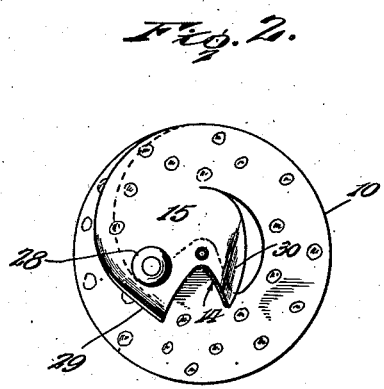
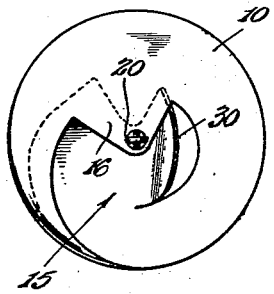
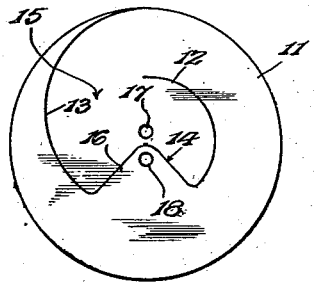
Inventor
J. E. Brown.
By Lacy & Lacy, Attorneys Patented Feb. 15, 1927.

1,617,318

UNITED STATES PATENT OFFICE.

JOHN EMMETT BROWN, OF ELYRIA, OHIO.

TROLLING LURE.

Application filed February 10, 1926. Serial No. 87,440.

This invention relates to an improved trolling lure and seeks, among other objects, to provide a device of this character embodying a spiral spinner, and wherein the spinner will be appropriately decorated to provide a very life-like bait.

The invention seeks, as a further object, to provide a device wherein the spiral spinner will be of novel construction and wherein said spinner will be fashioned from a circular metal blank.

Still another object of the invention is to provide a device wherein the spinner will be so formed that the lure will be caused to wobble in various directions as the device is drawn through the water.

And the invention seeks, as a still further object, to provide a device wherein the stem employed will be so formed that the lure will tend to rise in the water as said lure is drawn forwardly therethrough.

Other objects of the invention not specifically mentioned in the foregoing will appear during the course of the following description.

In the accompanying drawings:

Figure 1 is a perspective view of my improved lure.

Figure 2 is a sectional view on the line 2—2 of Figure 1, looking in the direction indicated by the arrows, and particularly showing the head of the spinner.

Figure 3 is a sectional view on the line 3—3 of Figure 1, looking in the direction indicated by the arrows.

Figure 4 is a plan view of the blank from which the spinner is formed.

In accordance with the present invention, I provide a spiral spinner 10 which is formed from a flat circular blank 11 of suitable resilient sheet metal. As shown in Figure 4, the blank is provided with a slit 12 concentric to the center of the blank as well as with an eccentric slit 13 extending to the periphery of the blank, and connecting the adjacent ends of said slits is a substantially V-shaped slit which provides the open mouth 14 of a head 15, the apex of the mouth touching the center of the blank. In thus forming the mouth, a substantially V-shaped lug 16 is defined, and formed in the head 15 near the apex of the mouth is an opening 17, while the lug 16 is provided near its apex with a like opening 18.

As will be perceived, the blank may be stamped at a single operation and after the stamping of the blank, said blank is bent into the spiral shape shown in Figures 1, 2 and 3 of the drawings, to form the spinner, the spinner being gradually tapered from the head to the tail thereof. In thus bending the blank, the lug 16 is, as will be seen, moved out of the mouth 14 of the head to lie in spaced relation to the head and the blank is twisted until the opening 18 of the lug is disposed in registration with the opening 17 in the head. Thus, a spindle or stem 19 may be disposed through said openings and, of course, the stem supports the spinner to freely turn thereon. Formed on the lower end of the stem is an eye 20 against which rests a thrust washer 21 for the spinner and freely connected with the eye is an appropriate hook 22, the shank of which is elongated so that the barbs of the hook lie some distance beyond the tail of the spinner. Near its upper end, the stem is bent to provide a laterally directed arm 23 terminating in a loop 24 to which is freely attached an appropriate swivel 25 and, of course, a line, as conventionally indicated at 26, is connected to said swivel. Surrounding the stem 19 to lie between the head 15 and lug 16 is a spacing sleeve 27.

As best shown in Figures 1 and 2 of the drawings, the spinner is preferably decorated in an appropriate manner to resemble a fish or other chosen bait, bright colors being employed so that the spinner will be rendered conspicuous, and in the instance illustrated, I have shown the head 15 as provided with the representation of an eye 28. Preferably, the nose of the head is, as particularly seen in Figure 1, bent to form an upwardly curved blade 29 while the jaw of the head is bent to form a downwardly curved blade 30.

As will now be seen, when the device is drawn through the water, the spinner 10 will be caused to rotate on the stem 19 and by providing the leading end of the spinner with the blades 29 and 30, the device is caused to wobble in various directions in the water so that the lure will thus have the semblance of darting from side to side and upwardly and downwardly in the water for attracting the catch. However, in forming the stem 19 with the arm 23, the pull on the line 26 is disposed out of alinement with the stem with the result that the device is, as it is drawn forwardly through the water, caused to rise therein. As will be appreciated, this feature is of advantage since the spinner may, as a result, be slowly drawn forwardly without sinking of the device to an undesirable depth. The sleeve 27 is provided for maintaining the convolutions of the spinner in spaced relation and preventing collapse of the spinner by the pressure created in drawing the device through the water.

Having thus described the invention, what I claim is:

1. A trolling lure including a stem provided at its upper end with a laterally directed arm for connection with a line, a hook carried by the lower end of the stem, and a spiral bait spinner rotatably mounted on the stem.

2. A trolling lure including a spiral bait spinner, a stem extending through portions of the convolutions of the spinner and rotatably mounting the spinner, a spacing sleeve mounted on the stem and bearing against but free of the convolutions of the spinner, and a hook carried by the stem.

3. A trolling lure including a stem provided with a hook, and a spiral bait spinner rotatably mounted on the stem and provided with means whereby the device is caused to wobble in the water when drawn therethrough.

4. A trolling lure including a stem provided with a hook, and a spiral bait spinner rotatably mounted on the stem and provided with a blade whereby the device is caused to wobble in the water when drawn therethrough.

5. A trolling lure including a stem provided with a hook, and a spiral bait spinner rotatably mounted upon the stem and provided at its forward end with opposite turned blades whereby the device is caused to wobble in the water when drawn therethrough.

6. A trolling lure including a stem provided with a hook, and a spiral bait spinner rotatably mounted upon the stem and fashioned from a slit blank bent to form the spinner.

7. A trolling lure including a stem provided with a hook, and a spiral bait spinner rotatably mounted upon the stem, said spinner having a notch in its inner edge at its forward end to define a head and being tapered from its forward end to the rear end thereof.

8. In a trolling lure, a spiral bait spinner fashioned from a circular blank.

9. In a trolling lure, a spiral bait spinner fashioned from a slit circular blank bent to define the convolutions of the spinner.

10. In a trolling lure, a spiral bait spinner fashioned from a slit circular blank bent to define the convolutions of the spinner, the slits in the blank defining a head having a mouth as well as defining a lug disposed in spaced relation to the head for receiving a stem passing through the head and said lug and rotatably mounting the spinner.

11. A spinner blank including a disc slit from a point within the periphery of the disc to a point on the periphery of the disc whereby the disc may be bent to define a spiral spinner.

In testimony whereof I affix my signature.

JOHN EMMETT BROWN. [L. S.]